United States Patent
Yan

(10) Patent No.: US 6,526,161 B1
(45) Date of Patent: Feb. 25, 2003

(54) SYSTEM AND METHOD FOR BIOMETRICS-BASED FACIAL FEATURE EXTRACTION

(75) Inventor: Yong Yan, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/385,280

(22) Filed: Aug. 30, 1999

(51) Int. Cl.[7] ............................................... G06K 9/46
(52) U.S. Cl. ....................... 382/118; 382/154; 382/199
(58) Field of Search .............................. 382/118, 154, 382/173, 199; 340/5.83, 5.53; 356/12

(56) References Cited

U.S. PATENT DOCUMENTS

| | | | |
|---|---|---|---|
| 4,975,969 A | 12/1990 | Tal | 382/2 |
| 5,471,542 A | * 11/1995 | Ragland | 351/208 |
| 5,805,745 A | * 9/1998 | Graf | 348/14.07 |
| 5,835,616 A | 11/1998 | Lobo et al. | 382/118 |
| 6,055,330 A | * 4/2000 | Eleftheriadis et al. | 382/154 |
| 6,188,777 B1 | * 2/2001 | Darrell et al. | 348/169 |
| 6,301,370 B1 | * 10/2001 | Steffens et al. | 342/90 |

OTHER PUBLICATIONS

Kim et al. "Object Oriented Face Detection Using Range and Color Information." Proc. Third IEEE Int. Conf. on Automatic Face and Gesture Recognition, Apr. 1998, pp. 76–81.* van Schalkwyk et al. "Low Bitrate Video Coding with Depth Compensation." Proc. IEE Vision, Image and Signal Processing, vol. 141, issue 3, Jun. 1994, pp. 149–153.*

Galicia et al. "Depth Based Recovery of Human Facial Features from Video Sequences." Proc. Int. Conf. on Image Processing vol. 2, Oct. 1995, pp. 603–606.*

Lengagne et al. "From 2D Images to 3D Face Geometry." Proc. Second Int. Conf. on Automatic Face and Gesture Recognition Oct. 1996, pp. 301–306.*

Xu et al. "Detecting Head Pose from Stereo Image Sequence for Active Face Recognition." Proc. Third IEEE Int. Conf. on Automatic Face and Gesture Recognition, Apr. 1998, pp. 82–87.*

"Finding Face Features", by Ian Craw et al, Computer Vision—ECCV '92, Second European Conference on Computer Vision, Sana Margherita Ligure, Italy, May 19–22, 1992 Proceedings.

"Two–Dimensional Signal and Image Processing", by J.S. Lim, Signals, Systems, and the Fourier Transform, Englewood Cliffs, NJ 1990, pp. 42–43.

"Image Sequence Coding at Very Low Bitrates: A Review", by Haibo Li et al, IEEE, vol. 3, No. 5, Sep. 1994, pp. 589–609.

"Feature Extraction from Faces Using Deformable Templates", by Alan L. Yuille et al, International Journal of Computer Vision, Aug. 2, 1992, pp. 99–111.

"Facial Model Refinement Using Stereo Image Sequence", by Chung J. Kuo et al, Signal and Media Laboratory Deprt. of Electrical Engineering, National Chung Chen University, Chiayi, Taiwan.

"Depth Discontinuities by Pixel–to–Pixel Stereo", by Stan Birchfield et al, Proceedings of the 1998 IEEE International conference on Computer Vision, Bombay, India.

* cited by examiner

*Primary Examiner*—Jon Chang

(57) ABSTRACT

A method and image processing system are disclosed that extract facial feature information from an image using biometrics information of a face. Regions of interests such as a face, eyes, nose and mouth are defined in the image. A combination of disparity mapping, edge detection and filtering are then used to extract coordinates/positions of the facial features in the regions of interest.

13 Claims, 6 Drawing Sheets

SYSTEM AND METHOD FOR BIOMETRICS-BASED FACIAL FEATURE EXTRACTION

FIELD OF THE INVENTION

The present invention pertains generally to the field of detecting human faces, and in particular, the invention relates to a system and method for locating facial features in a digital image using biometrics information.

BACKGROUND OF THE INVENTION

Systems and methods are known that analyze digital images and recognize human faces. Extraction of facial feature information has been used for various applications such as in automated/surveillance systems, monitoring systems, human interfaces to computers, television and video signal analysis.

Conventional facial detection systems use methods such as facial color tone detection, template matching or edge detection approaches. There are, however, numerous shortcomings to these types of conventional systems. In general, these conventional systems lack robustness, e.g., due to variations in human races, facial expression and lighting conditions.

More particularly, in systems using facial color tone detection, for example, a tint conversion is applied to an input digital image to determine skin-color regions. A mask pattern based upon the skin-color regions is used extract characteristic facial regions. However, depending on light sources, the hue of the respective facial regions may change, which causes difficulty in extracting accurate information. In addition, movement, while the digital image is generated, may cause shadows which also causes difficulty in detecting the skin-color regions accurately.

In systems using template matching, facial templates are first determined based upon average positions of facial features (i.e., eyes, nose and mouth) for a particular sex or race. A digital image is then matched to a template to identify sex or race. One shortcoming of this type of system is that expressions, e.g., a smile, may cause the wrong template to be used which leads to incorrect results.

Conventional systems using edge detection are also known. Edge detection approaches are useful in locating the position of eyes because the eyes typically have high edge density values. However, eye glasses and facial hair such as a mustache may cause these conventional systems to generate erroneous results. In addition, edge detection can not typically be used to determine the position of a nose.

There thus exists in the art a need for improved systems and methods for extraction of facial features from digital images that provide robust performance despite variations in the facial features due to movement or different facial expressions.

BRIEF SUMMARY OF THE INVENTION

It is an object of the present invention to address the limitations of the conventional extraction systems discussed above.

It is a further object of the invention to provide a facial feature extraction system that uses biometrics information to define regions of interest in an image and to accurately extract positions of facial features.

In one aspect of the present invention, an image processing device includes a disparity detector that compares locations of like pixel information in a pair of images and determines disparity information and a region detector which identifies a region of interest in one of the images in accordance with the disparity information. The region of interest includes a plurality of facial features. The device also includes a first position detector coupled to the region detector which identifies a position of one of the facial features in accordance with the disparity information.

In another aspect of the invention, an image processing apparatus includes a disparity detector that determines disparity information and an outline identifier that determines approximate boundaries of a face in an image based upon a comparison of a predetermined threshold value and the disparity information. The device also includes a nose position identifier that identifies a position of a nose in the face in accordance with the disparity information within a center region of the face.

One embodiment of the invention relates to a method of determining positions of facial features in an image that includes the steps of calculating a disparity between a pair of images and determining a face region of interest (ROI) in at least one of the images. The method also includes the step of identifying a nose position within the face region of interest in accordance with the calculated disparity.

Another embodiment of the invention relates to a computer-readable memory medium including code for processing a pair of images. The memory medium includes code to compare locations of like pixel information in a pair of images to determine disparity information and code to identify a region of interest in one of the images in accordance with the disparity information. The region of interest includes a plurality of facial features. The memory medium also includes code to identify a position of one of the facial features in accordance with the disparity information.

These and other embodiments and aspects of the present invention are exemplified in the following detailed disclosure.

BRIEF DESCRIPTION OF DRAWINGS

The features and advantages of the present invention can be understood by reference to the detailed description of the preferred embodiments set forth below taken with the drawings, in which.

DESCRIPTION OF THE PREFERRED EMBODIMENTS

Figure 1:
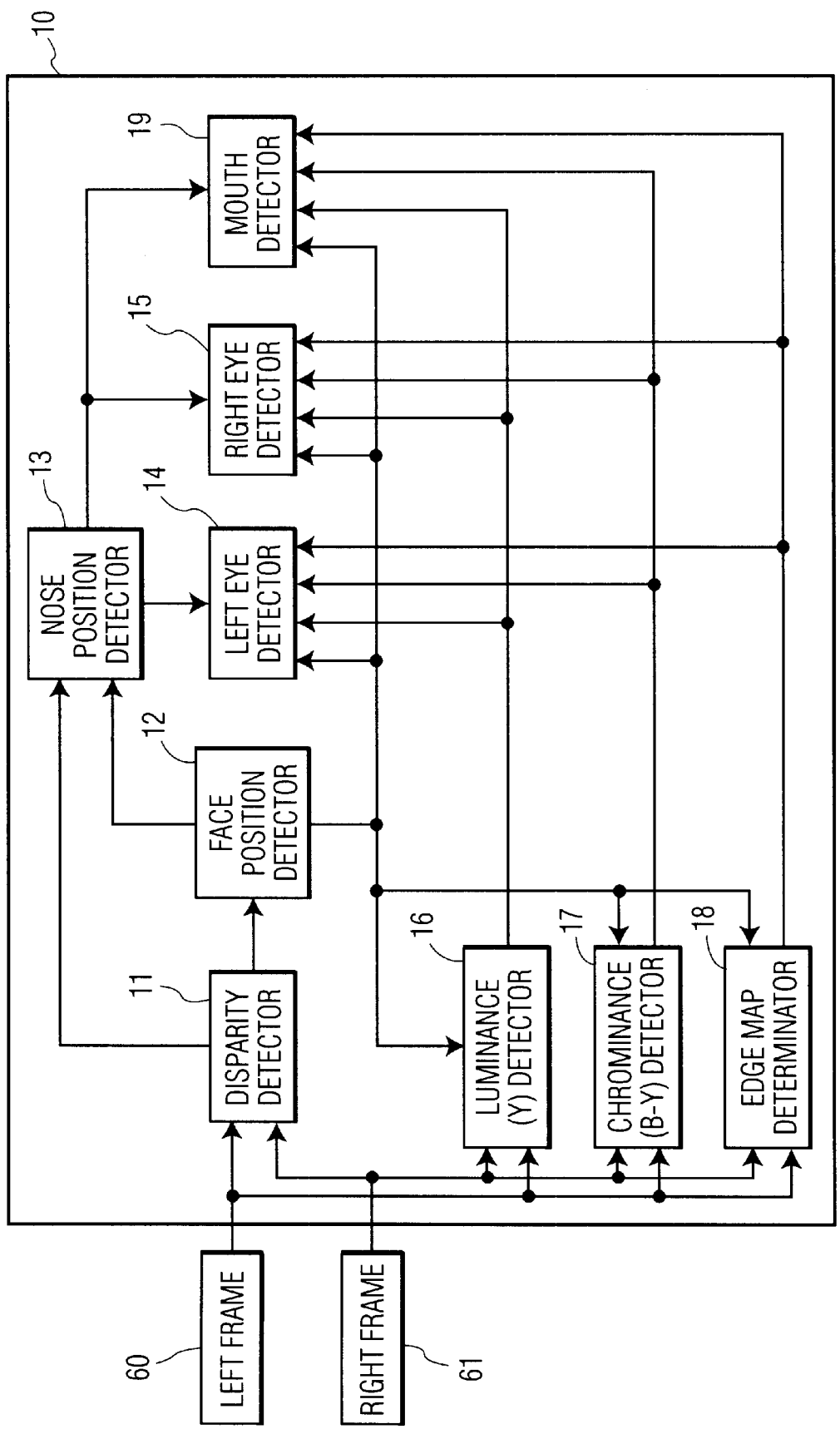
FIG. 1 is a block diagram of a facial feature extraction system in accordance with one aspect of the present invention.

Referring now to FIG. 1, a facial feature extraction system 10 is shown. Generally, the system 10 uses human face biometrics information (i.e., general positions of the nose, eyes and mouth) to define regions of interests (ROI) in an image. A combination of disparity mapping, edge detection and filtering are used to extract coordinates/positions of the facial features.

In a preferred embodiment, the system 10 is implemented by computer readable code executed by a data processing apparatus. The code may be stored in a memory within the data processing apparatus or read/downloaded from a memory medium such as a CD-ROM or floppy disk. In other embodiments, hardware circuitry may be used in place of, or in combination with, software instructions to implement the invention. For example, the invention may implemented on a digital television platform using a Trimedia processor for processing and a television monitor for display. The invention can also be implemented on a computer shown in FIG. 2.

Figure 2:
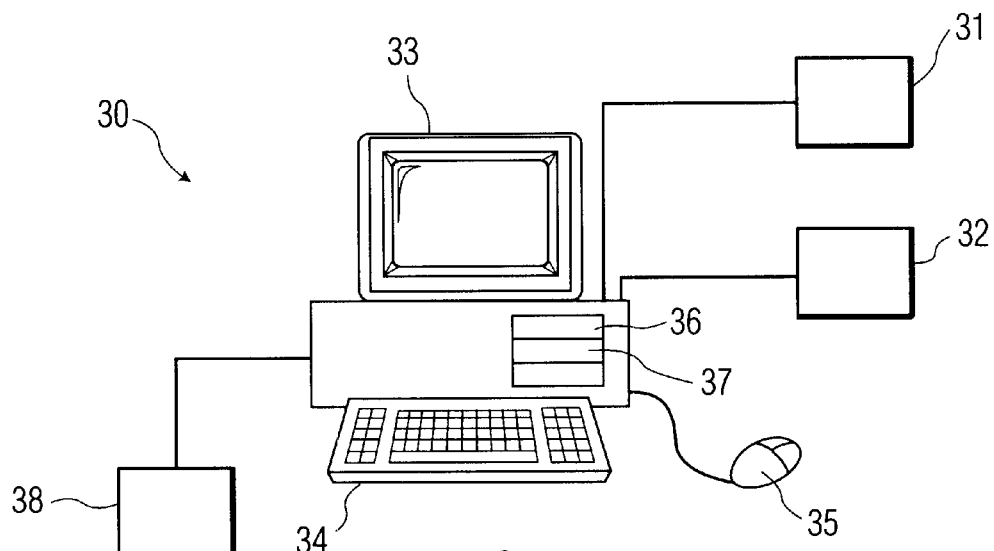
FIG. 2 is a block diagram of an exemplary computer system capable of supporting the system of FIG. 1.

As shown in FIG. 2, a computer 10 includes a network connection 31 for interfacing to a network, such as a variable-bandwidth network or the Internet, and a fax/modem connection 32 for interfacing with other remote sources such as a video or digital camera (not shown). The computer 10 also includes a display 33 for displaying information (including video data) to a user, a keyboard 34 for inputting text and user commands, a mouse 35 for positioning a cursor on the display 33 and for inputting user commands, a disk drive 36 for reading from and writing to floppy disks installed therein, and a CD-ROM drive 37 for accessing information stored on CD-ROM. The computer 30 may also have one or more peripheral devices attached thereto, such as a pair of video conference cameras for inputting images, or the like, and a printer 38 for outputting images, text, or the like.

Figure 3:
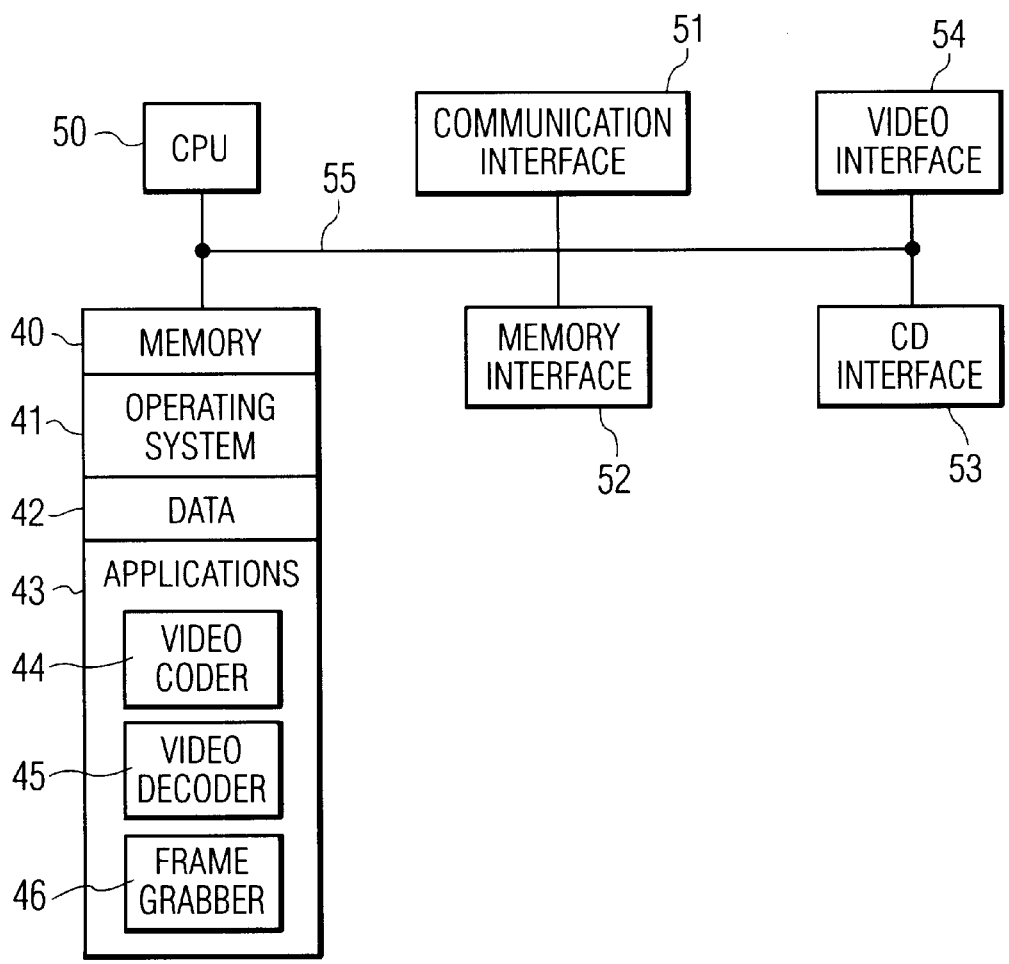
FIG. 3 is a block diagram showing the architecture of the computer system of FIG. 2.

FIG. 3 shows the internal structure of the computer 10 which includes a memory 40 that may include a Random Access Memory (RAM), Read-Only Memory (ROM) and a computer-readable medium such as a hard disk. The items stored in the memory 40 include an operating system 41, data 42 and applications 43. In preferred embodiments of the invention, the operating system 41 is a windowing operating system, such as UNIX; although the invention may be used with other operating systems as well such as Microsoft Windows95. Among the applications stored in memory 40 are a video coder 44, a video decoder 45 and a frame grabber 46. The video coder 44 encodes video data in a conventional manner, and the video decoder 45 decodes video data which has been coded in the conventional manner. The frame grabber 46 allows single frames from a video signal stream to be captured and processed.

Also included in the computer 30 are a central processing unit (CPU) 50, a communication interface 51, a memory interface 52, a CD-ROM drive interface 53, a video interface 54 and a bus 55 The CPU 50 comprises a microprocessor or the like for executing computer readable code, i.e., applications, such those noted above, out of the memory 50. Such applications may be stored in memory 40 (as noted above) or, alternatively, on a floppy disk in disk drive 36 or a CD-ROM in CD-ROM drive 37. The CPU 50 accesses the applications (or other data) stored on a floppy disk via the memory interface 52 and accesses the applications (or other data) stored on a CD-ROM via CD-ROM drive interface 53.

Application execution and other tasks of the computer 30 may be initiated using the keyboard 34 or the mouse 35. Output results from applications running on the computer 30 may be displayed to a user on display 34 or, alternatively, output via network connection 31. For example, input video data may be received through the video interface 54 or the network connection 31. The input video data may be decoded by the video decoder 45. Output video data may be coded by the video coder 44 for transmission through the video interface 54 or the network interface 31. The display 33 preferably comprises a display processor for forming video images based on decoded video data provided by the CPU 50 over the bus 55. Output results from the various applications may be provided to the printer 38.

Figure 4:
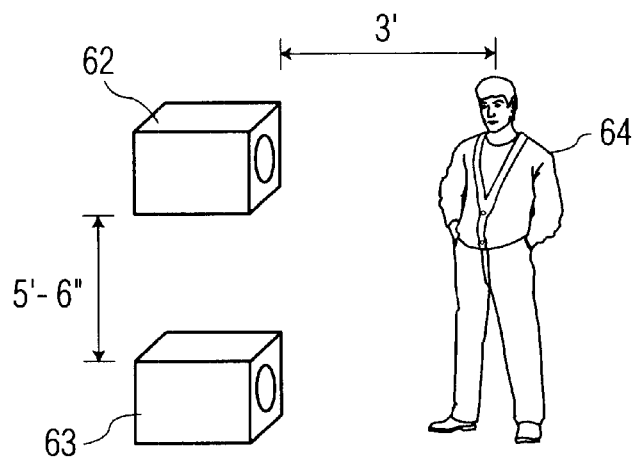
FIG. 4 is a block diagram showing an exemplary arrangement in accordance with a preferred embodiment of the invention.

Returning to FIG. 1, a pair of stereo digital images comprising a left frame 60 and a right frame 61 are input to the system 10. For example, the digital images may be received from two cameras 62 and 63 (shown in FIG. 4) and stored in the memory 40 for subsequent processing. The cameras 62 and 63 may be part of another system such as a video conferencing system or a security system. The cameras 62 and 63 are closely located to each other and a subject 64 is located a short distance away from the cameras 62 and 63. As shown in FIG. 4, the cameras 62 and 63 are 5 to 6 inches apart and the subject is 3 feet away from the cameras 62 and 63. It should be understood, however, that the invention is not limited to these distances and that the distances shown in FIG. 4 are merely exemplary.

Figure 5A:
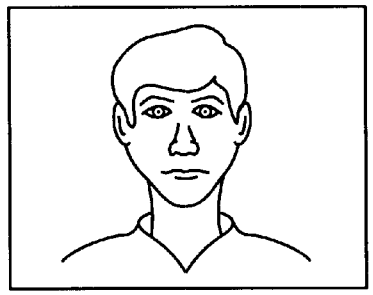
FIGS. 5A and 5B are schematic views of a subject in accordance with one embodiment of the invention.
Figure 5B:
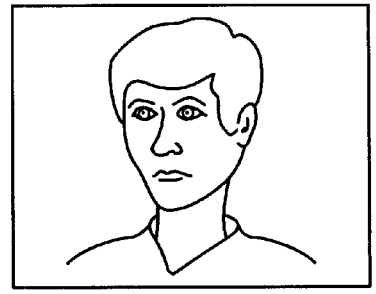

Preferably, the camera 62 takes a front view image of the subject 64 as shown in FIG. 5A. The camera 63 takes an offset or side view of the subject 64 as shown in FIG. 5B. This allows for a comparison to be made of the left frame 60 and the right frame 61 to determine a disparity map. In a preferred embodiment of the invention, the left frame 60 (image A) is compared to a right frame 61 (image B). The reverse comparison, however, may also be performed.

The digital images can be conceptualized as comprising a plurality of horizontal scan lines and a plurality of vertical columns that form an array pixels. The number of scan lines and columns determines the resolution of the digital image. To determine the disparity map, scan lines are lined up, e.g. scan line 10 of image A matches scan line 10 of image B. A pixel on scan line 10 of image A is then matched to its corresponding pixel in scan line 10 of image B. So, for example, if the $15^{th}$ pixel of scan line 10 of image A matches the $10^{th}$ pixel of scan line 10 of image B, the disparity is calculated as follows: 15−10=5. It is noted that when the left and right cameras 62 and 63 are closely located, the pixels of foreground information, e.g. a human face, of an image will have a larger disparity than pixels of background information. The disparity calculations are performed by a disparity detector 11 shown in FIG. 1.

Figure 6:
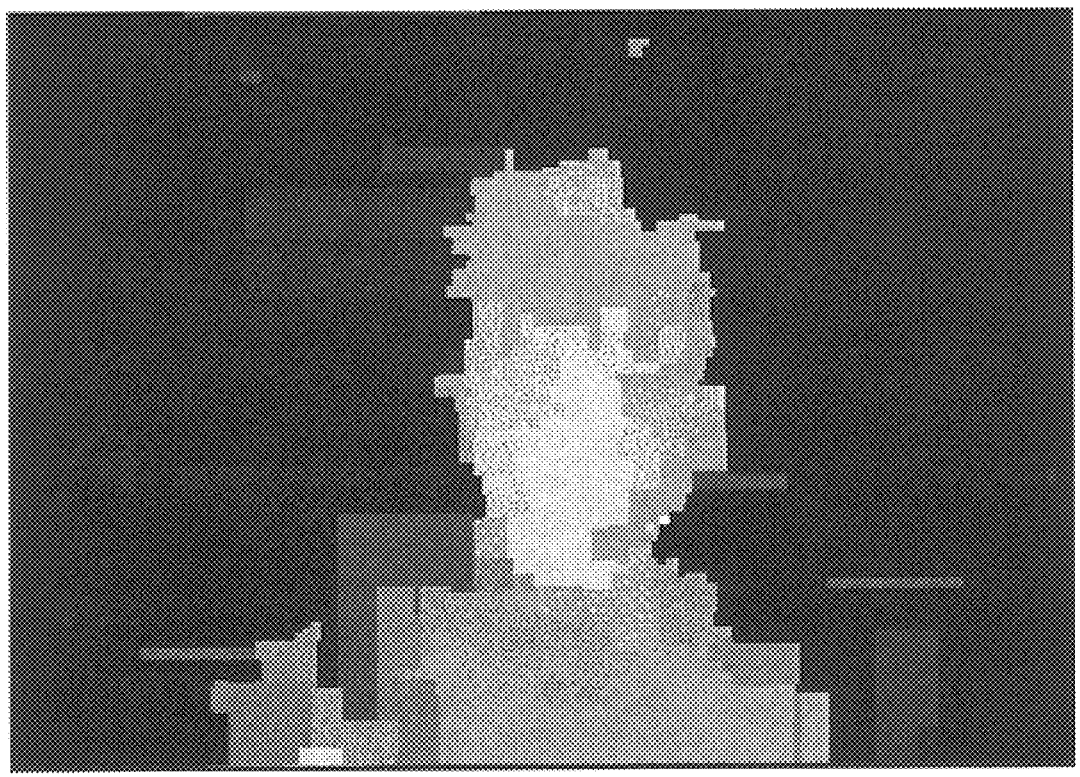
FIG. 6 is a disparity map in accordance with a preferred embodiment of the invention.

A disparity map based upon the disparity calculations may be stored in the memory 40. Each scan line (or column) of the image would have a profile consisting a disparity for each pixel in that scan line (or column). FIG. 6 is an example of a graphical representation of a disparity map based on a digital image of the subject 64. In this embodiment, the grayscale level of each pixel indicates the magnitude of the calculated disparity for that pixel. The darker the grayscale level the lower the disparity.

A disparity threshold may be chosen, e.g. 10, and any disparity above the disparity threshold indicates the pixel is foreground information (i.e. the subject 64) while any disparity below 10 indicates the pixel is background information. The selection of the disparity threshold is based in part on the distances discussed above in regard to FIG. 4. For example, a lower disparity threshold may be used if the subject 64 is position at a greater distance from the cameras 61 and 62; or a higher disparity threshold may be used if the cameras 61 and 62 are further apart from each other.

Figure 7:
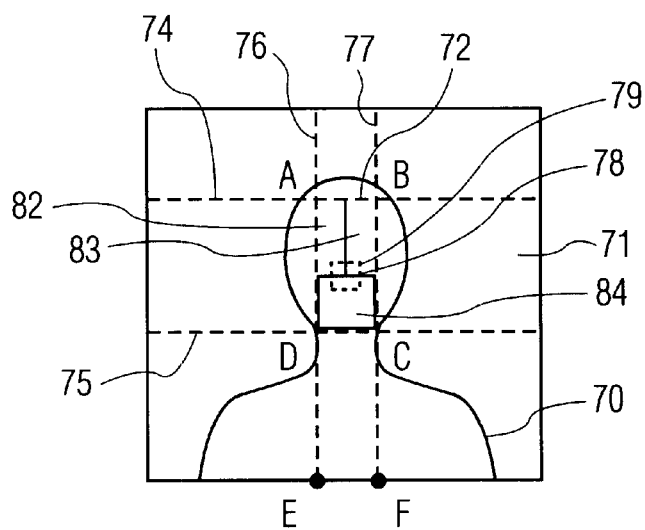
FIG. 7 is a schematic diagram of an image showing various regions of interest.

As shown in FIG. 7, a foreground 70 and a background 71 of the left frame is determined based on the calculated disparity map and the disparity threshold. The foreground 70 essentially represents the head and body of the subject 64. Preferably, as shown in FIG. 7, the foreground 70 should comprise approximately 50 percent of the frame (i.e., 50 percent of the total number of pixels). This ensures that that face of the subject is not too large, which could cause portions of the face to be truncated, or very small, which could cause difficulties in data processing. of course, the invention is not limited to this size of the foreground 70.

A face region of interest (face ROI) 72 is then determined by a face position determinator 12 (shown in FIG. 1). As shown in FIG. 7, the face ROI 72 is a rectangle region bounded by boundary lines 73, 74, 75 and 76.

Figure 8:
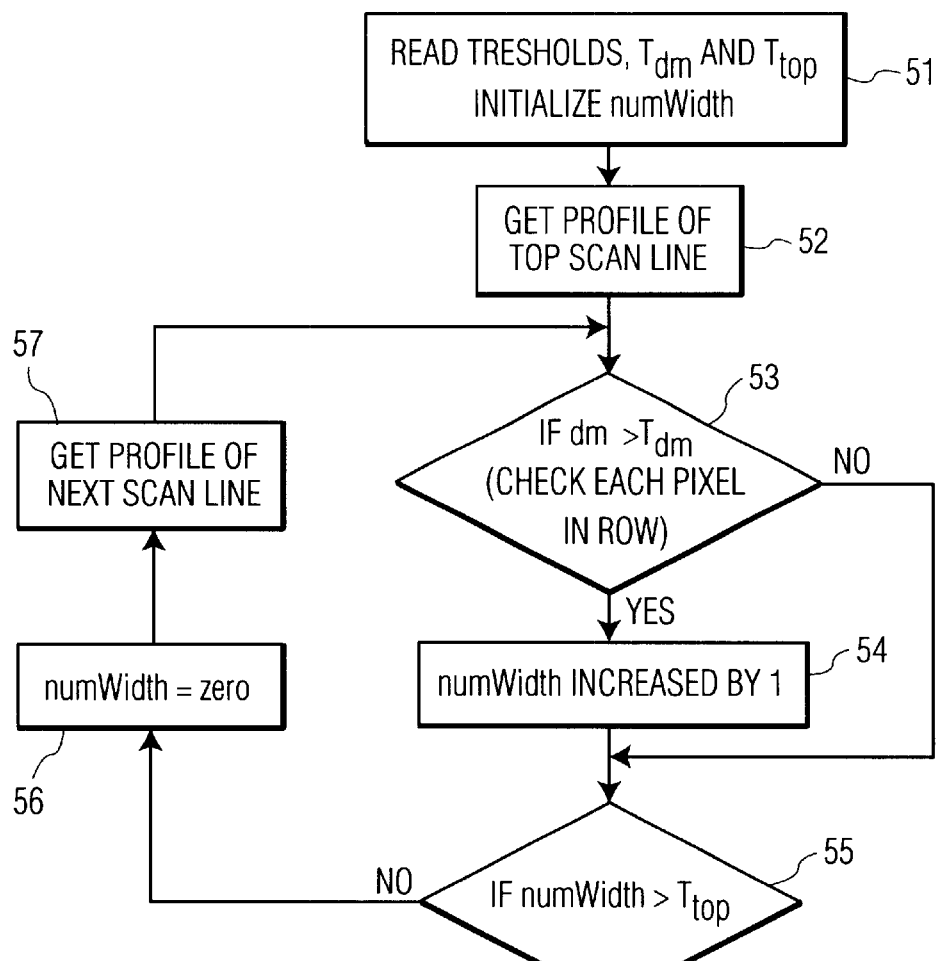
FIG. 8 is a flow chart of a process in accordance with one aspect of the invention.

FIG. 8 is a flow chart showing the steps for determining the upper boundary line 74. In step S1, the disparity threshold ($T_{dm}$) and a top threshold ($T_{top}$) are read. A variable numwidth is also set to zero. Selection of the disparity threshold is discussed above. In the embodiment shown in FIG. 7, the value of $T_{top}$ is equal to the number of pixels between points A and B. Similar to the selection of the disparity threshold, $T_{top}$ is based in part on the distances shown in FIG. 4. For example, as discussed above, the foreground 71 is approximately 50 percent of the frame. In this configuration, the value of $T_{top}$ is selected to be approximately 20 percent of the total width of a scan line. The invention, however, is not limited to this $T_{top}$ value.

In step S2, the profile of the top scan line is retrieved. As discussed above, this consists of the calculated disparity values for each pixel in that scan line. Next, if the disparity value (dm) for a particular pixel is greater than $T_{dm}$, then the value of numwidth is increased by one in step S4. This determination is made for each pixel in that scan line. Thus, if 20 pixels in one scan line have dm's greater than $T_{dm}$, then numWidth would have a value of 20. In step S5, if the value of numWidth is greater than $T_{top}$, the current scan line is determined to be the upper boundary line 74. Otherwise, the numWidth is made equal to zero in step S6 and the next lower (i.e., from top to bottom) scan line profile is retrieved. The steps are then repeated until the upper boundary line 74 is determined.

To determine the lower boundary line 57, steps similar to those shown in FIG. 8 are followed. The value of $T_{dm}$ is the same. The value of a bottom threshold ($T_{bottom}$) (which is used in place of $T_{top}$) is equal to the number of pixels between points D and C (shown in FIG. 7). The value of $T_{bottom}$ is determined in a manner similar to that of $T_{top}$. However, unlike step S2 shown in FIG. 8, this process starts with the bottom scan line and works up. Since the process works up from the bottom scan line, the values of numWidth will be greater than $T_{bottom}$ until a vicinity near the neck of the subject is reached. Accordingly, the boundary line 75 is determined to be the scan line when numWidth is less than $T_{bottom}$.

The left boundary line 76 and the right boundary line 77 are also determined in a similar manner. A left threshold ($T_{left}$) is equal to the number of pixels between points A and E shown in FIG. 7. A right threshold ($T_{right}$) is equal to the number of pixels between points B and F. For determining the left boundary line 76, the process starts with a profile of the left most column of pixels of the frame and proceeds toward the right side of the frame. For determining the right boundary line 77, the process starts with a profile of the right-most column of pixels of the frame and proceeds toward the left side of the frame. The left and right boundary lines 76 and 77 are determined to be the column when the value of numHieght (which is used in place of numWidth) is greater than $T_{left}$ and $T_{right}$, respectively.

The face ROI 72 is then defined by a rectangle ABCD formed by the intersection of the boundary lines 74–77. The shape of face ROI 72 is preferably a rectangle shape, however, it is not limited to this shape. For example, the face ROI may be an square, circle or oval. To calculate an oval, for example, first the foreground 70 may be determined using the disparity map. The neck region of the subject is then determined by selecting a threshold ($T_{neck}$) and a process similar to determining the lower boundary line 75 is followed. The background 71 and the portion of the foreground 70 below the neck region are removed or made to be a value of zero. A curve (i.e., oval) fitting routine is then used to approximate the shape of the remainder.

Once the face ROI 72 has been obtained the position of the nose can be determined. This is done by the nose position determinator 13 shown in FIG. 1. First, a center 78 (shown in FIG. 7) of the face ROI 72 is determined. Since the length and width of the rectangle ABCD and its position in the frame is known, the center 78 can easily be obtained. In a similar manner, if the face ROI is a square, circle or oval, the center can easily be obtained. A center region 79 is defined to be approximately 10 percent of the area of the face ROI 72. As shown in FIG. 7, the center region 79 is a square, however, other shapes may be used.

Figure 9:
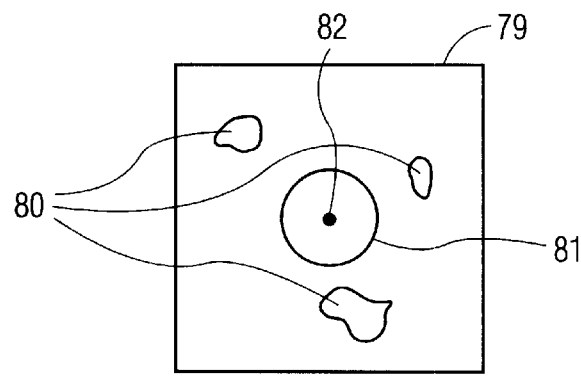
FIG. 9 is a schematic diagram of a disparity map of a nose region in accordance with one aspect of the invention.

The nose position is located at the place with the highest disparity value (dm) within the center region 79. To determine areas having the highest dm, a histogram process may be used. Computing a histogram of an image can be performed quickly because it requires little computation. This will result with one or more areas 80 and 81 within the center region 79 having the highest dm, as shown in FIG. 9. The areas 80 and 81 typically each include a plurality of pixels. In the case of more than one area, a center 82 of the largest area 81 will be the nose position, the other smaller areas 80 may be noise or flat spots in the nose of the subject 64. In the unlikely situation of two or more areas having the same size and being the largest, an average may be taken to determine the center position.

To determine the largest area 81, the following process is preferred. After the areas 80 and 81 are determined. The pixels within these areas 80 and 81 are set to a value of one. All the other pixels within the center region 79 are set to a value of zero. This quantizes the center region 79 in a binary manner. The height and/or width of each of the areas 80 and 81 (i.e., based on the number of pixels in the area) is determined. The area having the largest height and/or width is the largest area 81. The center of the largest area 81 is determined to be the nose position.

After the nose position is obtained by the nose position determinator 13, left-eye and right-eye determinators 14 and 15 (shown in FIG. 1) determine the positions of eyes. A rough position of the eyes is first estimated by the position of the nose. As shown in FIG. 7, a left-eye ROI 82 and a right-eye ROI 83 are estimated to be one-half of the area above the nose position, respectively.

Figure 10:
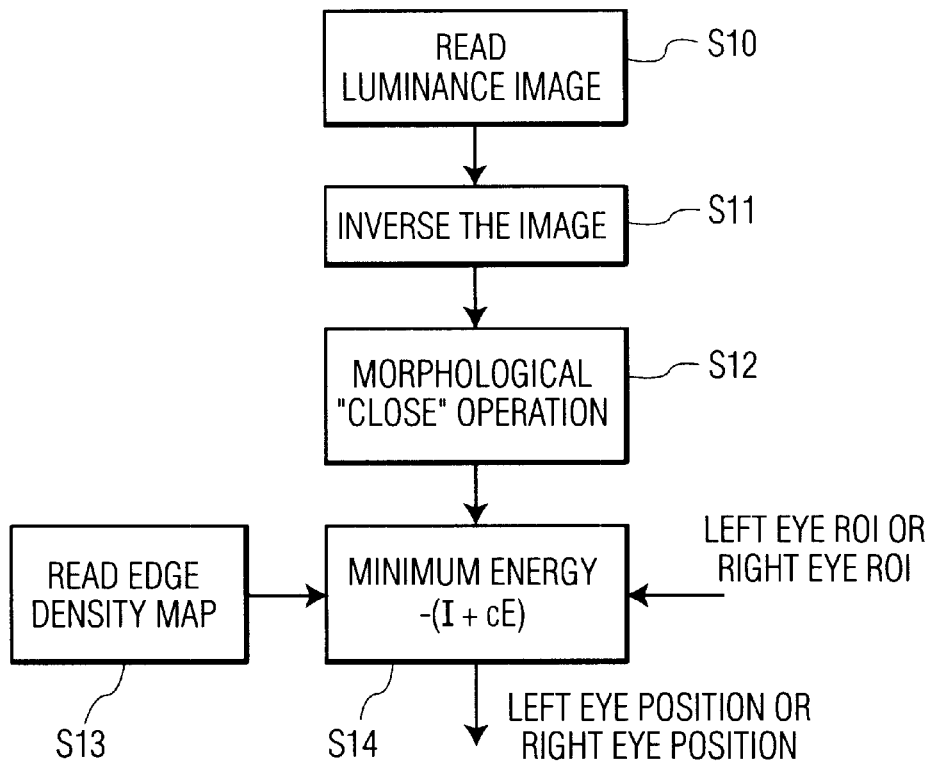
FIG. 10 is a flow chart of a process in accordance with one aspect of the invention.

FIG. 10 shows a flow chart for determining the eye positions. In step S10, a luminance image of the left frame 60 is obtained from a luminance detector 18 (shown in FIG. 1). This results in an image wherein the eyes typically have a minimum gray level (i.e., appear as dark areas). The inverse of this image is obtained in step S11. In the inverse image, the eyes will have a maximum gray level (i.e., appear as bright areas). This allows the processing calculations to be performed in a more efficient manner. In step S12, a morphological "close" operation is performed on the inverse image.

A morphological filter is a two step minimum-maximum process that will enhance some facial features such as the eyes and the mouth. For example, in the filter, first a minimum gray level in a 3×3 block is obtained. The minimum value is assigned to the center of the block. The maximum gray level in the 3×3 block is then obtained. The maximum value is then assigned to the center of the block. This reduces the dynamic range and increases the local contrast of the image.

In step S13, an edge density map is formed by taking the maximum edge strength using the luminance from the luminance detector 16 and a chrominance from the chrominance detector 17. This is performed by an edge map detector 18 (shown in FIG. 1). Preferably, the edge detection results are obtained by a Sobel operation on the left frame 60 luminance and chrominance components (see, e.g., J. S. Lim, "Two-Dimensional Signal and Image Processing, Prentice-Hall, 1990, pp. 498–485, incorporated herein by reference). It is noted, however, that other methods of edge detection may be used such as a Robert operation.

The Sobel operation obtains gradient vectors at respective pixels in the input image. The direction of the gradient vector indicates the direction in which the gradient of brightness of the image is largest. The regions along the pixels having the largest gradient vector magnitudes typically form edges in the image. From this data, the edge density map may be generated.

The edge density map is obtained for the detection of edge and texture density around the eye areas of the subject 64. The eye areas typically have a high edge density, which is defined as the number of neighboring pixels that are on the edge within a given neighborhood. For example, in a 3×3 neighborhood, the edge density may range from 0 to 9. A value of 0 means that no pixels are on an edge, while a value of 9 means that all the pixels in that neighborhood are on an edge. Preferably, in the present invention, a 5×5 neighborhoods are used.

In step S14, the left-eye or right-eye-position is determined based on the result of the morphological "close" operation (I) and the edge density map (E). The minimum value in the left-eye ROI 82 or the right-eye ROI 83 is determined to be the respective eye position. The value of constant c in step S14 ranges from zero to one; increasing the value of c emphases edge texture and decreasing the value of c emphases the image itself. Preferably, the value of c is approximately 0.3 for robustness of the system.

Similar to determining a left- or right-eye ROI, a mouth ROI 84 (shown in FIG. 7) is estimated to be the portion of the face ROI 72 below the determined nose position. The position of the mouth is preferably determined by a Gaussian weighted Radon transformation (see, e.g., J. S. Lim, "Two-Dimensional Signal and Image Processing, Prentice-Hall, 1990, pp. 42–45, incorporated herein by reference). Since the horizontal coordinate of the center of the mouth is close to that of the nose position, a Radon transformation in a horizontal direction (i.e., a projection of the function at an angle θ=zero) is applied on the edge map from the edge map determinator 18. A Gaussian function that is centered at the center of the mouth ROI 84 is used to weight the responses.

Figure 11:
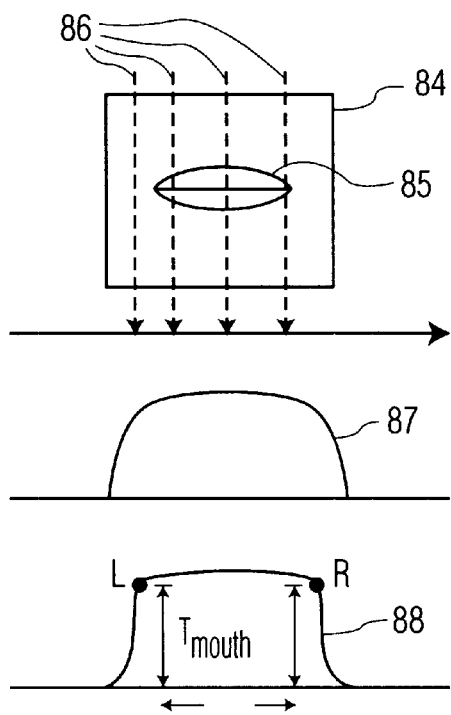
FIG. 11 is a diagram showing a Radon projection in accordance with one aspect of the invention.

For example, as shown in FIG. 11, an edge map 85 of the mouth ROI 84 is shown in which arrows 86 represent integration projections for the Radon transformation. A Gaussian filter 87 is applied to the Radon transformation. From a resulting Radon projection 88, corners L and R of the mouth are obtained. The corners L and R are found by starting at the center of the Radon projection 88 and moving toward the left or right to determine where a value of the Radon projection is less than a threshold ($T_{mouth}$). Since the Radon projection 88 drops sharply to zero at each end (i.e. beyond the corners L and R of the mouth), $T_{mouth}$ may be selected to be any non-zero value, preferably in the range of 1–10.

After the corners L and R are determined, the mouth ROI 84 is adjusted (i.e., reduced) accordingly. Using the adjusted mouth ROI 84, the vertical position the center of the mouth is searched. A Radon transformation is used in the vertical direction of the edge map of the adjusted mouth ROI 84. The position of maximum response is identified as the vertical position of the center of the mouth. In order to search for the upper and lower lip positions, the vertical Radon responses are again examined. The two positions having the largest responses are identified as the boundary of the upper lip. Similarly, the boundaries of the lower lip are chosen from the center below.

The system 10 then outputs the coordinates of the facial features of the subject 64. The system 10 may also output the left frame 60 with indications of the facial features and various ROI's outlined or highlighted.

The invention has numerous applications in the field of surveillance and security systems or in any application in which face recognition is required. The invention also has applications in video conferencing.

Typically in video conferencing, a majority of the picture data in any given scene consists of irrelevant information, for example objects in the background. Compression algorithms cannot distinguish between relevant and irrelevant objects and if all of this information is transmitted on a low bandwidth channel, the result is a delayed "jumpy" looking video of a video conference participant. The present invention, for example, allows the face of a participate to be identified so that it may be transmitted at a different rate than the background information. This allows the movements of the face to be in synchronization with the audio and prevents a "jumpy" look.

While the present invention has been described above in terms of specific embodiments, it is to be understood that the invention is not intended to be confined or limited to the embodiments disclosed herein. For example, the invention is not limited to any specific type of filtering or mathematical transformation or to any particular input image scale or orientation. On the contrary, the present invention is intended to cover various structures and modifications thereof included within the spirit and scope of the appended claims.

What is claimed is:

1. An image processing device comprising:
   a disparity detector arranged to compare locations of like pixel information in a pair of images to determine disparity information;
   a region detector which identifies a region of interest in one of the images in accordance with the disparity information, the region of interest including a plurality of facial features;

a first position detector coupled to the region detector which identifies a position of a nose in accordance with the disparity information; and a second position detector coupled to the first position detector which identifies a location of a mouth in accordance with the position of the nose, wherein the second position detector identifies an approximate area for the location of the mouth based upon the position of the nose and determines the location of the mouth in accordance with an edge density of the approximate area and a Radon transformation.

2. The image processing device according to claim 1, wherein the position corresponds to a location where a disparity value is largest as compared to other disparity values in the region of interest.

3. The image processing device according to claim 2, wherein the first position detector includes a sub-region detector which identifies a portion of the region of interest in which the nose is located before comparing the disparity values.

4. The image processing device according to claim 1, wherein a result of the Radon transformation is weighted by a Gaussian filter.

5. The image processing device according to claim 1, wherein the pair of images are received from a stereo pair of cameras in a video conference system.

6. A method of determining positions of facial features in an image comprising the steps of:

calculating a disparity between a pair of images;

determining a face region of interest (ROI) in at least one of the images;

identifying a nose position within the face region of interest in accordance with the calculated disparity; and identifying a mouth position within the face ROI in accordance with a Radon transformation operation on an edge density value of the at least one image.

7. The method according to claim 6, wherein the calculating step includes:

identifying locations of like pixels in each of the pair of images; and calculating a difference between the locations of like pixels.

8. The method according to claim 6, wherein the determining step includes determining for each set of like pixels whether a disparity value between the locations falls above or below a predetermined threshold, and if so identifying a scan line or pixel column as a boundary line for the face ROI.

9. The method according to claim 6, wherein the identifying step includes:

determining a center region of the face ROI;

calculating a histogram to determine a largest disparity value within the center region;

if more than one area within the center region is determined in the step of using the histogram, determining which area is largest as compared to the other areas; and using a center of the largest area as the position of the nose position.

10. The method according to claim 6, further comprising the step of identifying an eye position within the face ROI in accordance with a luminance value and an edge density value of the at least one image.

11. The method according to claim 10, wherein the step of identifying the eye position includes the steps of:

determining an approximate area of the eye position; and calculating the edge density value using a Sobel operation.

12. The method according to claim 6, wherein the step of identifying the mouth position includes:

weighting a result of the Radon transformation by a Gaussian filter; and identifying a corner of the mouth position to be where the weighted result is greater than a predetermined threshold.

13. A computer-readable memory medium including code for processing a pair of images, the code comprising:

disparity detecting code to compare locations of like pixel information in a pair of images to determine disparity information;

region detecting code to identify a region of interest in one of the images in accordance with the disparity information, the region of interest including a plurality of facial features;

first position detecting code to identify a position of a nose in accordance with the disparity information; and second position detecting code to identify a location of a mouth in accordance with the position of the nose and in accordance with an edge density and a Radon transformation.

* * * * *